United States Patent [19]

Jennings et al.

[11] Patent Number: 4,983,688

[45] Date of Patent: Jan. 8, 1991

[54] LIQUID CRYSTAL POLYMER COMPOSITIONS

[75] Inventors: Thomas C. Jennings, Gates Mill; David M. Tanno, Richmond Heights, both of Ohio

[73] Assignee: Synthetic Products Company, Cleveland, Ohio

[21] Appl. No.: 344,595

[22] Filed: Apr. 28, 1989

[51] Int. Cl.$^5$ .................. C08L 67/04; C08L 67/03; C08L 77/12; C08L 85/00

[52] U.S. Cl. .................. 525/389; 525/419; 525/434; 525/437; 525/439; 525/450

[58] Field of Search ............ 525/389, 419, 434, 437, 525/439, 450; 524/396

[56] References Cited

U.S. PATENT DOCUMENTS

| | | | |
|---|---|---|---|
| 3,340,339 | 9/1967 | Ullman | 264/131 |
| 3,674,894 | 7/1972 | Economy et al. | 260/875 |
| 3,804,805 | 4/1974 | Kuhfuss | 528/195 |
| 3,884,825 | 5/1975 | Linblad et al. | 252/62.1 |
| 3,973,982 | 8/1976 | Bingham | 106/298 |
| 4,096,109 | 6/1978 | Watanabe et al. | 260/40 R |
| 4,101,523 | 6/1978 | Watanabe et al. | 528/309 |
| 4,155,898 | 5/1979 | Bopp et al. | 260/40 R |
| 4,198,458 | 4/1980 | Mitsuishi et al. | 428/212 |
| 4,304,807 | 12/1981 | Kawakami et al. | 428/148 |
| 4,440,889 | 4/1984 | Hergenrother et al. | 524/143 |
| 4,458,039 | 7/1984 | Eickman | 523/216 |
| 4,461,797 | 7/1984 | Adachi et al. | 428/147 |
| 4,490,522 | 12/1984 | Kawabata et al. | 528/388 |
| 4,505,966 | 3/1985 | Adachi et al. | 428/141 |

*Primary Examiner*—Patricia Short
*Attorney, Agent, or Firm*—Wood, Herron & Evans

[57] ABSTRACT

Liquid crystal polymer (LCP) compositions are disclosed containing a LCP and a polymeric polyvalent metal aromatic polycarboxylate where the polymeric carboxylate is heat stable at processing temperatures of the LCP. The compositions offer the physical properties of high mechanical strength, durability, toughness, chemical resistance and high temperature performance, among others.

18 Claims, 1 Drawing Sheet

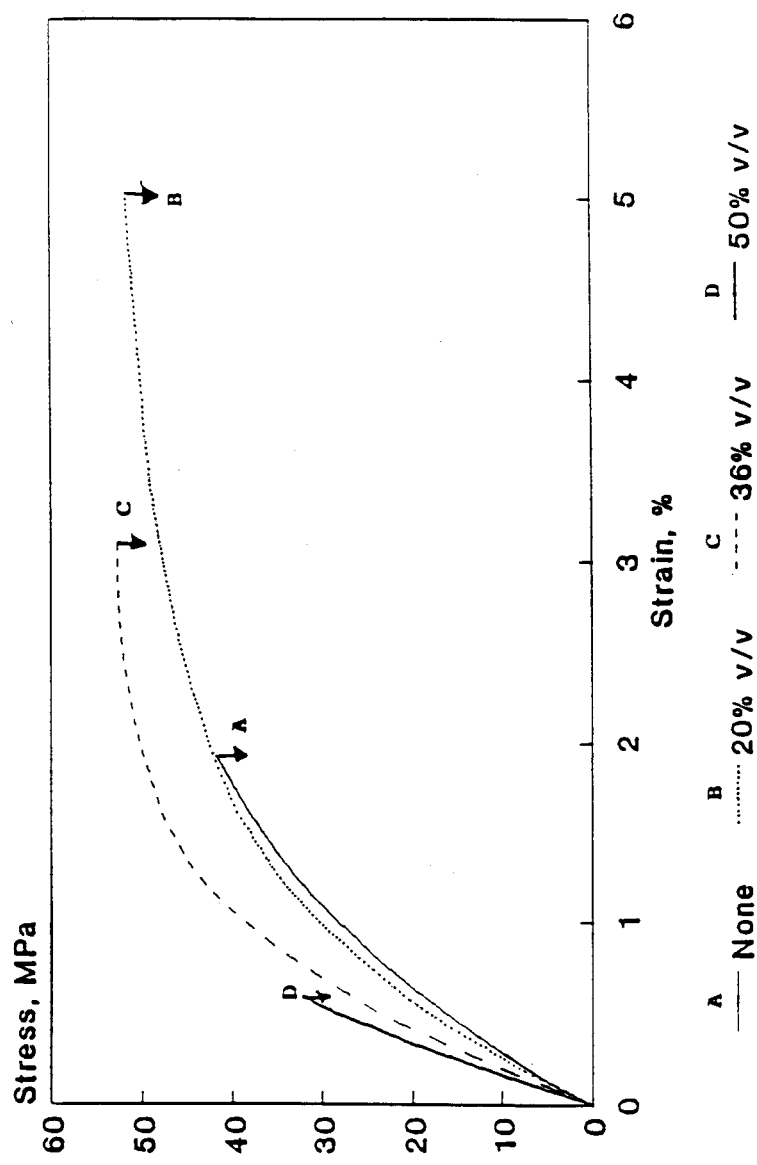

LIQUID CRYSTAL POLYMER COMPOSITIONS

BACKGROUND OF THE INVENTION

Liquid crystal polymers offer a wide variety of key property requirements in molded articles including high mechanical strength, durability, toughness, chemical resistance and high temperature performance, among others. One of the most severe limitations to the use of liquid crystal polymers (LCPs) is the current high price of such polymers. It would be very desirable if improvements were made in LCP compositions to take advantage of the many physical properties and overcome the price disadvantage.

In the past, various fillers and reinforcing agents have been added to LCPs to reduce the cost and perhaps reinforce the polymer matrix. Fillers and/or reinforcing agents that have been added include glass fibers, asbestos, graphitic carbon fibers, amorphous carbon fibers, synthetic polymeric fibers, aluminum fibers, steel fibers, silica, clays, talc, mica, polytetrafluoroethylene, among others, as has been reported in U.S. Pat. No. 4,548,039. While fillers tend to reduce the overall cost of articles made from the LCP blends, their inclusion usually involves a concomitant reduction in mechanical properties. Thus, there is a significant need that exists for new liquid crystalline polymer compositions that have superior physical properties, yet without high cost. There is also a need for further improvements in LCP compositions.

SUMMARY OF THE INVENTION

This invention is directed to unique liquid crystal polymer compositions that offer a number of significant advantages in articles molded therefrom including lower density, high temperature stability, moisture resistance and moldability by conventional molding equipment. The liquid crystal polymer compositions of this invention comprise a liquid crystal polymer (LCP) and a polymeric polyvalent metal aromatic polycarboxylate that is heat stable at the processing temperatures of the LCP. It has been found that a polymeric metal carboxylate when contained in an effective amount will even improve the physical properties of the LCP. For instance, it has been found that when blends of LCP and a polymeric metal carboxylate are formulated, mechanical properties of articles molded therefrom such as elongation at break, tensile strength and modulus are all increased.

In a preferred form, a thermotropic liquid crystal polymer such as a copolymer of hydroxybenzoic acid (about 75 mole %) and hydroxynaphthoic acid (about 25 mole %), i.e., Celenese Vectra A950 is used. This LCP and calcium terephthalate are blended and molded into test bars to demonstrate the benefits of the invention. Strong adhesion between the LCP and the calcium terephthalate has been observed. Tensile strength, elongation at break and modulus were determined for such test bars and, quite unexpectedly, all three properties were improved. These results exemplify the broader aspects of this invention where a new class of additives selected from polymeric polyvalent metal aromatic carboxylates are added to liquid crystal polymers as property extenders, reinforcing agents and even agents to improve the physical properties of molded articles produced therefrom.

In a broader aspect, the liquid crystal polymer suitable for use in the present invention may be selected from a class of well known wholly aromatic polyesters, aromatic-aliphatic polyesters, wholly aromatic poly(ester-amides), aromatic-aliphatic poly(ester-amides), aromatic polyazomethines, aromatic polyester-carbonates, and mixtures of the same. Furthermore, the polymeric polyvalent metal aromatic carboxylate may also be selected from the broad class of polymeric metal salts where the polymeric carboxylate group is selected from the group consisting of terephthalate, trimellitate, pyromellitate, 2,6-naphthalene dicarboxylate and trimesate. The polyvalent metal salt of the polymeric carboxylate is preferably selected from the group consisting of magnesium, calcium, strontium, barium, zinc and aluminum for safety and ecological reasons. The most preferred polymeric metal carboxylate is calcium terephthalate. Amounts on the order of from about 10 to about 50% by volume of such polymeric metal carboxylates may be employed in blends with the liquid crystal polymer. It has also been found that there are critical ranges of amounts of the polymeric metal carboxylate in the blend in order to obtain the desired benefits and improvements according to this invention, depending upon the specific liquid crystal polymer and polymeric metal carboxylate employed.

The liquid crystal polymer compositions of this invention containing the polymeric metal carboxylate, and molded or extruded articles produced from such compositions, as well as the advantages of such compositions, will be further understood with reference to the detailed description hereinafter.

DETAILED DESCRIPTION

I. Liquid Crystalline Polymers Generally

The liquid crystal polymers suitable for use in accordance with the principles of this invention have been well developed in the art. These polymers have been described by various terms, including "liquid crystalline", "liquid crystal", and "anisotropic". Briefly, the polymers of this class are thought to involve a parallel ordering of the molecular chains often referred to either as the liquid crystal state or the nematic phase of the liquid crystal state. The ordered array gives significant strength and reinforcement in the molded articles without sacrificing processability or heat distortion properties. These polymers are prepared from monomers which are generally long, flat and fairly rigid along the long axis of the molecule and have chain extending linkages that are either coaxial or parallel. The term "wholly aromatic" as employed herein refers to a linear thermotropic liquid crystal polymer in which each recurring monomeric unit contributes at least one aromatic nucleus to the polymer backbone The polymers may be lyotropic or thermotropic liquid crystal polymers. Lyotropic liquid crystal polymers are polymers which are liquid crystalline in solution. Thermotropic liquid crystal polymers readily form liquid crystals (i.e., exhibit anisotropic properties) in the melt phase. Such properties may be confirmed by conventional polarized light techniques whereby crossed polarizers are utilized. More specifically, the anisotropic phase may be confirmed by the use of a Leitz polarizing microscope at a magnification of 40× with the sample on a Leitz hot stage and under nitrogen atmosphere. The polymer is optically anisotropic, i.e., it transmits light when examined between crossed polarizers. Polarized light is transmitted when the sample is optically anisotropic even in the static state.

Classes of polymers from which the thermotropic liquid crystalline polymer suitable for use in the present invention may be selected include wholly aromatic polyesters, aromatic-aliphatic polyesters, wholly aromatic poly(ester-amides), aromatic-aliphatic polyesters, aromatic poly(ester-amides), aromatic-aliphatic poly(ester-amides), aromatic polyazomethines, aromatic polyester-carbonates, and mixtures of the same. In preferred embodiments the thermotropic liquid crystalline polymer is a wholly aromatic polyester, a wholly aromatic poly(ester-amide), or an aromatic-aliphatic poly(ester-amide), and mixtures of the same. In such wholly aromatic polyester and wholly aromatic poly(ester-amide) each moiety present within the polymer chain contributes at least one aromatic ring. Also, it is preferred that naphthalene moieties be included in the thermotropic liquid crystalline polymer, e.g., 6-oxy-2-naphthoyl moiety, 2,6-dioxynaphthalene moiety, or 2,6-dicarboxynaphthalene moiety, in a concentration of not less than about 10 mole percent The particularly preferred naphthalene moiety for inclusion in the thermotropic liquid crystalline polymer is the 6-oxy-2-naphthoyl moiety in a concentration of not less than about 10 mole percent.

Wholly aromatic polyesters that exhibit thermotropic liquid crystalline properties include those disclosed in the following U.S. Patents which are herein incorporated by reference U.S. Pat. Nos.: 3,991,012; 3,991,014; 4,066,620; 4,067,852; 4,075,262; 4,083,829; 4,093,595; 4,118,372; 4,130,545; 4,146,702; 4,153,779; 4,156,070; 4,159,365; 4,161,470; 4,169,933; 4,181,792; 4,183,895; 4,184,996; 4,188,476; 4,201,856; 4,219,461; 4,224,433; 4,226,970; 4,230,817; 4,232,143; 4,232,144; 4,238,598; 4,238,599; 4,238,600; 4,242,496; 4,245,082; 4,245,084; 4,247,514; 4,256,624; 4,265,802; 4,267,304; 4,269,965; 4,279,803; 4,294,955; 4,299,756; 4,318,841; 4,337,190; 4,337,191 and 4,355,134.

Aromatic-aliphatic polyesters that exhibit thermotropic liquid crystalline properties are copolymers of polyethylene terephthalate and hydroxybenzoic acid as disclosed in Polyester X-7G-A Self Reinforced Thermoplastic, by W. J. Jackson, Jr., H. F. Kuhfuss, and T. F. Gray, Jr., 30th Anniversary Technical Conference, 1975 Reinforced Plastics/Composites Institute, The Society of the Plastics Industry, Inc., Section 17-D, Pages 1–4. A further disclosure of such copolymers can be found in "Liquid Crystal Polymers: I Preparation and Properties of p-Hydroxybenzoic Acid Copolymers", Journal of Polymer Science, Polymer Chemistry Edition, Vol. 14, pages 2043 to 2058 (1976), by W. J. Jackson, Jr. and H. F. Kuhfuss. See also U.S. Pat. No. 4,138,842 and U.S. Pat. No. 4,355,133 which are herein incorporated by reference.

Wholly aromatic and aromatic-aliphatic poly(ester-amides) that exhibit thermotropic liquid crystalline properties are disclosed in U.S. Pat. Nos. 4,272,625; 4,330,457; 4,339,375; 4,341,688; 4,351,917; 4,351,918 and 4,355,132.

Aromatic polyazomethines that exhibit thermotropic liquid crystalline properties are disclosed in U.S. Pat. Nos. 3,493,522; 3,493,524; 3,503,739; 3,516,970; 3,516,971; 3,526,611; 4,048,148 and 4,122,070. Each of these patents is herein incorporated by reference in its entirety. Specific examples of such polymers include poly(nitrolo-2-methyl-1,4-phenylenenitriloethylidyne-1,4-phenyleneethylidyne); poly(nitrolo-2-methyl-1,4-phenylenenitri-lomethlidyne-1,4-phenyleneme-thylidyne); and poly(nitrolo-2-chloro-1,4-phenylenenitrilomethylidyne1,4-phenylene-methylidyne).

Aromatic polyester-carbonates that exhibit thermotropic liquid crystalline properties are disclosed in U.S. Pat. Nos. 4,107,143 and 4,284,757, and in commonly assigned U.S. Ser. No. 319,024, filed Nov. 6, 1981, now U.S. Pat. No. 4,371,660, which are herein incorporated by reference. Examples of such polymers include those consisting essentially of p-oxybenzoyl units, p-dioxyphenyl units, dioxycarbonyl units, and terephthaloyl units.

The above thermotropic liquid crystalline polymers preferred for use possess a melting temperature within the range that is amenable to melt extrusion or molding while employing commerically available equipment. For instance, thermotropic liquid crystalline polymers are selected which exhibit a melting temperature somewhere within the range of approximately 250° to 400° C. Other examples of liquid crystalline polymer compositions are disclosed in U.S. Pat. Nos. 4,710,547; 4,708,976; 4,650,836; 4,624,872; 4,614,784; 4,540,737; 4,536,561; 4,458,039; 4,439,578 and 4,377,681. These patents are merely listed for purposes of illustration and are incorporated herein by reference as being directed to examples of thermotropic liquid crystal polymers suitable for use in accordance with this invention.

II—Polymeric Polyvalent Metal Salts of Aromatic Polycarboxylic Acids

The polymeric polyvalent metal aromatic polycarboxylates suitable for use in accordance with the principles of this invention may be derived from a broad class of compounds. In short, the term "polymeric metal carboxylate" is used hereinafter to define a member of this class.

The polymeric polyvalent metal salts are divalent, trivalent or higher valent metal salts of aromatic polycarboxylic acids exemplified by terephthalic, trimellitic, pyromellitic, trimesic and 2,6-naphthalene dicarboxylic acids. The metal cations of these salts include divalent calcium, magnesium, cadmium, zinc, lead, cobalt, strontium, barium, nickel, copper and tin ions; and the trivalent aluminum, cerium, indium, iron, cesium and chromium ions. Preferably, the metal cations include calcium, magnesium, strontium, barium, zinc and aluminum. Polyfunctional aromatic polycarboxylic acids useful in accordance with the principles of this invention may be exemplified by the aromatic nucleus of benzene, naphthalene, anthracene or the like. In a preferred form, the polymeric metal carboxylate includes the 1,4 benzene dicarboxylate group in the polymeric structure.

The essential criteria for the polymeric polyvalent metal salts of this invention are the polymeric nature of the aromatic polycarboxylate and its thermal stability at processing temperatures of the liquid crystal polymer. Thus, it will be understood that while a number of polymeric salts have been actually exemplified hereinafter, others may be used to accomplish the purposes of this invention. It is believed that certain salts exist as substantially linear polymers in the divalent metal-dicarboxylate form with the equivalence of the oxygens bonded to the metal ion. However, other forms may be crosslinked where the functionality of the metal and carboxylates admit of crosslinking. Thus, the term "polymeric metal carboxylate" has been adopted to herein define this general class useful according to the broader aspects of the compositions and methods of this invention. The class of polymeric metal carboxylates suitable for use according to this invention all are characterized by heat stability at the processing temperatures of the liquid crystal polymer. The heat stabilities of polymeric metal terephthalate salts are exemplified by the decomposition temperatures listed in the following Table.

TABLE I

Decomposition Temperatures of Polymeric Metal Terephthalates

| Metal | Decomposition Temperature |
|---|---|
| Aluminum | 540° C. |
| Barium | 640° C. |
| Cadminum | 430° C. |
| Calcium | 620° C. |
| Cobalt | 475° C. |
| Magnesium | 625° C. |
| Lead | 425° C. |
| Nickel | 440° C. |
| Strontium | 630° C. |
| Zinc | 430° C. |

All determine by means of TGA (termogravimetric analysis) under nitrogen at a heating rate of 10° C./minute In addition to the decomposition temperatures of Table I polymeric terephthalates, the following TABLES II through VII disclose decomposition temperatures of other polymeric metal carboxylates as were determined by differential scanning calorimetry in accordance with the practice described in ASTM Standard D3418.

TABLE II

Decomposition Temperatures of Other Polymeric Metal Terephthalates (Anion Abbreviated as "T")

| Metal | Decomposition Temperature |
|---|---|
| GeOT | 350° C. |
| SeT$_2$ | 375° C. |
| TeT$_2$ | 375° C. |
| Dy$_2$T$_3$ | 650° C. |
| HfT$_2$ | 485° C. |
| Ga$_2$T$_3$ | (3 Stage) |
|  | 380° C. |
|  | 550° C. |
|  | 675° C. |
| WT$_3$ | 450° C. |
| Ta$_2$O$_3$T$_2$ | 375° C. |
| MoO$_2$T | 350° C. |
| SnT | 430° C. |
| SnT$_2$ | 360° C. |
| HgT | 360° C. |

TABLE III

Decomposition Temperatures of Polymeric Metal Trimesates (Anion Abbreviated as "M")

| Metal | Decomposition Temperature |
|---|---|
| Zn$_3$M$_2$ | (2 Stage) |
|  | 500° C. |
|  | 750° C. |
| GaM | (2 Stage) |
|  | 450° C. |
|  | 750° C. |
| HfM$_2$ (but only 2 COOH reacted) | 440° C. |
| WM$_3$ | 450° C. |
| MoOM | 440° C. |
| TaOM | 440° C. |

TABLE IV

Decomposition Temperatures of Polymeric Metal Trimellitates (Anion Abbreviated as "TM")

| Metal | Decomposition Temperature |
|---|---|
| TaO(TM) | 500° C. |
| Mo(TM)$_2$ | 325° C. |
| Hf(TM)$_2$ (but only 2 of 3 acid groups reacted) | 325° C. |
| W(TM)$_3$ | 375° C. |
| Ga(TM) | 360° C. |

TABLE V

Decomposition Temperatures of Polymeric Metal Pyromellitates (Anion Abbreviated as "PM")

| Metal | Decomposition Temperature |
|---|---|
| Ga(PM) (but only 3 of 4 acid groups reacted) | 350° C. |
| W$_2$(PM)$_3$ | 480° C. |
| Hf(PM) | 375° C. |
| MoO(PM) | 330° C. |
| Ta$_2$O(PM)$_2$ | 320° C. |

TABLE VI

Decomposition Temperatures of Polymeric Metal 5-sulfonate-1,3-isophthalates (Anion Abbreviated as "SP")

| Metal | Decomposition Temperature |
|---|---|
| TaO(SP) | 350° C. |
| MoO(SP) | 370° C. |
| HfO$_{\frac{1}{2}}$ (SP) | 310° C. |
| W(SP)$_2$ | 310° C. |
| Ga(SP) | 285° C. |

TABLE VII

Decomposition Temperatures of Polymeric Metal Isophthalates (Anion Abbreviated as "IP")

| Metal | Decomposition Temperature |
|---|---|
| Ga$_2$(IP)$_3$ | (2 Stage) |
|  | 380° C. |
|  | 560° C. |
| W(IP)$_3$ | 385° C. |
| Hf(IP)$_2$ | 410° C. |
| MoO$_2$IP | 335° C. |
| Ta$_2$O$_3$(IP)$_2$ | 340° C. |

The high temperature stabilities of the polymeric metal carboxylates are thus distinguishable from the low temperature behavior of benzoates and orthophthalates, the latter of which are typical of that of metal salts of organic acids. Salt decomposition temperatures of acetates, stearates and other benzoates, recorded in the literature, suggests 200–280° C. as the normal range.

BRIEF DESCRIPTION OF THE FIGURE

FIG. 1 is a stress-stain curve illustrating liquid crystal polymer compositions of the invention containing various amounts of polymeric calcium trephthalate.

The following examples illustrate the practice of this invention and a number of its parameters. With reference to FIG. 1, a stress-strain curve is illustrated for liquid crystal polymer compositions of this invention containing various amounts of calcium terephthalate. These compositions were formulated by using Celanese Vectra A950 (identified above) thermotropic liquid crystal polymer (LCP) as blended with polymeric calcium terephthalate (CAT) fibers. The LCP and CAT were dried overnight in an oven at 180° C. Thereafter, the LCP and CAT were weighed (calculated to yield 60 ml) and then added to a Brabender mixer and mixed at 300° C. for 20 minutes. The resulting blend was placed in a frame mold and heated to 200° C. in a press. Pressure was increased to approximately 10 MPa in three stages and released after the first two stages and maintained upon reaching 10 MPa (1 MPa is equal to approximately 1420 psi). The temperature was increased to 300° C. under the 10 MPa pressure. The press was water cooled to room temperature under pressure. Four dumbbell shaped tensile test bars were cut and routed from the compression molded plaques and tested on an Instron tensile tester at 1%/minute in a manner similar to ASTM 638. The tensile strength, elongation at break and modulus were calculated by averaging the specimens tested. These results are reported in FIG. 1 for varying amounts of CAT with LCP.

With reference to FIG. 1, curve A illustrates that the LCP without any CAT had a maximum elongation of about 2% at break point and a tensile of about 40 MPa. Curve B illustrates that where 20% by volume CAT was added to the LCP, both elongation and tensile improved at the same time, i.e., elongation at break was about 5% and tensile strength was about 50 MPa. It should be observed that improvement in both elongation and tensile at the same time is unexpected and does not occur with a filler. This data demonstrates strong adhesion between the LCP and the CAT and such is considered to be responsible for the enhancement of the properties. Usually, an increase in elongation occurs at the expense of decreasing the tensile. The surprising effects of increased elongation and tensile are also observed at 36% by volume CAT in the LCP where elongation was increased to about 3% and tensile strength to about 53% MPa. At 50% by volume CAT, the increased effects on elongation and tensile strength are lost, thereby indicating that there is a critical range of amounts of CAT and LCP in order to obtain the desired improvements according to the principles of this invention. When one considers that calcium terephthalate is just as brittle as glass in its pure material state, indeed the results according to FIG. 1 and the above data are quite surprising. These results illustrate the principles of this invention and differentiate it from the prior art.

The test bars molded as above from the LCP alone and with polymeric calcium terephthalate demonstrated high temperature resistance, heat stability and moisture resistance as illustrated by Table VIII hereinafter.

TABLE VIII

| STABILITY EVALUATIONS | | |
|---|---|---|
| CONDITION | LCP | LCP & POLYMERIC CALCIUM TEREPHTHALATE |
| 24 Hours at 450° F. | No discoloration No weight loss | No discoloration No weight loss |
| 24 Hours Water Immersed | No weight change | No weight change |
| 2 Hours | 0.1% | 0.1% |

TABLE VIII-continued

| STABILITY EVALUATIONS | | |
|---|---|---|
| CONDITION | LCP | LCP & POLYMERIC CALCIUM TEREPHTHALATE |
| Boiling Water | weight change | weight change |

The method of preparing the polymeric calcium terephthalate fibers used in the foregoing experiments with reference to FIG. 1 involved charging 750 kgs of water into a reactor equipped with an agitator and about 3.64 kgs of sodium salt of polymethylacrylic acid wetting agent having an average molecular weight of about 12,000 was added thereto to form a good dispersion. Thereafter, terephthalic acid in an amount of 31.61 kilograms was added slowly to the charged reactor to form a uniform dispersion, whereupon the aqueous charge was heated to about 85≈90° C. and held at this temperature for the remainder of the preparation. Over a period of about 1 to 3 hours, 15.14 kgs of Ca(OH)$_2$ were added slowly at as uniform a rate as possible. When all the calcium hydroxide had been added, mixing was continued until crystals of the terephthalic acid were all consumed as determined by microscopic examination at 60X during which time fibers of polymeric calcium terephthalate precipitated. This method normally produces fibers of polymeric calcium terephthalate averaging in the range of about 5:1 to about 20:1 aspect ratio. As these fibers are produced, they are easily differentiated from the cubic or rhombic crystals of terephthalic acid that are consumed during the preparation.

The copolyesters of the present invention can contain nuceating agents, fillers, pigments, fibers, mineral reinforcing agents, antioxidants, stabilizers, plasticizers, lubricants, fire-retardants and other additives.

Having described this invention in its various forms including liquid crystal polymer compositions, methods of making such with polymeric polyvalent metal aromatic carboxylates, and molded articles resulting therefrom, it will be apparent to a person of ordinary skill in the art that other modifications may be made without departing from the scope of this invention.

What is claimed is:

1. A liquid crystal polymer composition comprising a liquid crystal polymer and a polymeric polyvalent metal aromatic polycarboxylate, said polymeric carboxylate being heat stable at temperatures for processing said liquid crystal polymer, said polymeric carboxylate contained in an effective amount as a reinforcing agent for said liquid crystal polymer.

2. The composition of claim 1 wherein said liquid crystal polymer is a copolymer of hydroxybenzoic acid and hydroxynaphthoic acid.

3. The composition of claim 1 wherein the aromatic polycarboxylate group of said polymeric polycarboxylate is selected from the group consisting of terephthalate, trimellitate, pyromellitate, trimesate and 2,6-naphthelene dicarboxylate.

4. The composition of claim 1 wherein said polyvalent metal of said polymeric polycarboxylate is selected from the group consisting of magnesium, calcium, strontium, barium, zinc and aluminum.

5. The composition of claim 4 wherein the polymeric polycarboxylate is calcium terephthalate.

6. The composition of claim 1 wherein the polymeric carboxylate is dispersed in said liquid crystal polymer in a particulate form having an aspect ratio of at least about 5:1.

7. The composition of claim 6 wherein the aspect ratio is on the order of about 5:1 to about 20:1.

8. The composition of claim 1 wherein said polymeric polycarboxylate is contained in an amount of from about 10 to about 50% by volume.

9. A heat stable moisture-resistant thermoplastic composition consisting essentially of
a liquid crystal polymer and a polymeric polyvalent metal aromatic polycarboxylate having a 1,4-benzene dicarboxylic acid group in the polymer chain,
said polymeric polycarboxylate contained in an effective amount as a reinforcing agent for said liquid crystal polymer and said polymeric carboxylate being heat stable at processing temperatures of said thermoplastic composition.

10. The composition of claim 9 wherein said benzene dicarboxylate group is terephthalate and the polyvalent metal is selected from the group consisting of calcium, magnesium, strontium, barium, zinc and aluminum.

11. The composition of claim 10 wherein said polymeric carboxylate is calcium terephthalate.

12. The composition of claim 9 wherein said liquid crystal polymer is a copolymer of hydroxybenzoic acid and hydroxynaphthoic acid.

13. The composition of claim 9 wherein said polymeric polycarboxylate is anhydrous.

14. The composition of claim 9 wherein said liquid crystal polymer is a copolymer of hydroxybenzoic acid and hydroxynaphthoic acid.

15. The composition of claim 9 wherein said aromatic polycarboxylate group of said polymeric polycarboxylate is selected from the group consisting of terephthalate, trimellitate, pyromellitate, trimesate and 2,6-naphthelenedicarboxylate and said polyvalent metal salt is selected from the group consisting of magnesium, calcium, strontium, barium, zinc and aluminum.

16. The composition of claim 9 wherein the polymeric carboxylate is calcium terephthalate.

17. The composition of claim 16 wherein the calcium terephthalate is contained in an amount of from about 10 to about 50% by volume.

18. A liquid crystal polymer composition comprising:
a liquid crystal polymer and
a polymeric polyvalent metal aromatic polycarboxylate,
said polymeric carboxylate being heat stable at temperatures for processing said liquid crystal polymer, said polymeric carboxylate contained in an amount of from about 10 to about 50 percent by volume.

* * * * *